(12) United States Patent
O'Connor et al.

(10) Patent No.: US 6,567,714 B2
(45) Date of Patent: May 20, 2003

(54) METHOD AND SYSTEM FOR MANUFACTURING A COMPUTER SYSTEM WITH THE ASSISTANCE OF A WIRELESS INFORMATION NETWORK

(75) Inventors: Clint H. O'Connor, Austin, TX (US); Damon W. Broder, Austin, TX (US); Reynold L. Liao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 09/770,132

(22) Filed: Jan. 26, 2001

(65) Prior Publication Data
US 2002/0103546 A1 Aug. 1, 2002

(51) Int. Cl.$^7$ .............................................. G06F 9/445
(52) U.S. Cl. ............................ 700/95; 700/96; 700/97; 700/115; 700/116; 700/117
(58) Field of Search ............................ 700/95–97, 115, 700/116, 117

(56) References Cited

U.S. PATENT DOCUMENTS

| | | | | | |
|---|---|---|---|---|---|
| 5,781,004 | A | * | 7/1998 | Gaete | 324/158.1 |
| 5,894,571 | A | | 4/1999 | O'Connor | 395/652 |
| 5,960,344 | A | * | 9/1999 | Mahany | 455/432 |
| 5,963,743 | A | * | 10/1999 | Amberg et al. | 707/104.1 |
| 5,991,543 | A | * | 11/1999 | Amberg et al. | 713/1 |
| 5,995,757 | A | | 11/1999 | Amberg et al. | 395/712 |
| 6,029,249 | A | * | 2/2000 | Atkinson | 713/323 |
| 6,075,943 | A | * | 6/2000 | Feinman | 717/175 |
| 6,151,012 | A | * | 11/2000 | Bullister | 345/168 |
| 6,236,901 | B1 | * | 5/2001 | Goss | 361/692 |
| 6,247,128 | B1 | * | 6/2001 | Fisher et al. | 713/1 |

* cited by examiner

Primary Examiner—Leo Picard
Assistant Examiner—Michael D Masinick
(74) Attorney, Agent, or Firm—Haynes and Boone, LLP

(57) ABSTRACT

A manufacturing process starts from installing a wireless communication subsystem on a computer system, and allows information exchanges made wirelessly by the computer system and a manufacturing control computer of the wireless information network to complete manufacturing the computer system.

19 Claims, 3 Drawing Sheets

METHOD AND SYSTEM FOR MANUFACTURING A COMPUTER SYSTEM WITH THE ASSISTANCE OF A WIRELESS INFORMATION NETWORK

CROSS-REFERENCE TO RELATED APPLICATIONS

This application relates to U.S. Pat. No. 6,236,901 issued May 22, 2001, entitled MANUFACTURING SYSTEM AND METHOD FOR ASSEMBLY OF COMPUTER SYSTEMS IN A BUILD-TO-ORDER ENVIRONMENT naming Lois Goss as inventor. The above-referenced patent is hereby incorporated herein by reference in its entirety and are assigned to the assignee of this application.

BACKGROUND

The disclosures herein relate generally to computer systems and more particularly to a method and system for manufacturing a computing product with the assistance of a wireless information network.

For many computer makers who manufacture computing products (CPs) such as personal computers (PCs) at a massive production scale, customizations of the products have caused a major setback in terms of the productivity of their manufacturing process. The time and engineering effort spent for each customization is a significant part of the manufacturing process. For example, the computer makers implement the customizations for end-users or customers by selectively installing software products or modules specially configured for the customers, which may contain an Operating System (OS), and numerous drivers and applications. Without an appropriate customization completed for the customer at the computer makers' sites, the customer would have to configure the CP extensively. Conventionally done in a streamlined manufacturing assembly line, the CP must be assembled with appropriate hardware components. Needed software and corresponding configuration data are then downloaded into each CP through a computer network or other medium (such as CD-ROMs) in the factory. All these must be done before the CP is packaged or boxed for shipping.

While manufacturing the CPs, major brand bearers such as Dell USA will use a number of OEM manufacturers who provide assembled CPs with standard hardware and software setups or standard components. The brand bearer has to configure the features of the assembled computing products so that they will meet the requirements of its customers. In the conventional manufacturing process, the packaging of the CPs delivered to the brand bearer has to be opened or destroyed to get the CPs running so that the configurations can be completed. This adds time and material cost for the manufacturing process. Moreover, once the configuration is done, the CPs have to be repackaged for shipping.

As more components of the CPs are standardized, more functions or features of these products are controlled or even provided by software (e.g. soft modems). Therefore, the level of requirement to customize the hardware is decreasing dramatically, while the software configuration becomes increasingly important. Given this technology advancement, it is thus desirable to configure the computing products according to customer configurations at the late stages of the manufacturing process, or even more desirable to be able to change the configurations after the computing products are packaged.

Another cumbersome and costly process for the CP manufacturers is to monitor the process flow to ensure all CPs shipped out meet the factory defined quality standards. Various communication events need to occur between CPs in the assembly line and control computers in the factory which monitor and track the production information. For example, information such as software download, information on the system hardware configuration and burn-in history are closely monitored over a wired Local Area Network connection through an input/output (I/O) port on each CP. Through this I/O connection, the factory server is aware of information such as burn-in failures and software download problems. However, while moving the CP through the assembly line flow, the CP can not stay connected all the time, and it has to be powered down and up for multiple times for different areas of the assembly. Even if the CP is turned on all the time, at least the I/O connection must be established and canceled while the CP is moved from place to place due to physical limitations of the wired manufacturing environment. It is understood that the physical act of repetitively connecting and disconnecting the I/O port in each CP exposes the CP to product reliability problems or to a high level of risk of being damaged.

When the CPs are successfully assembled and tested, the finished CPs are stored temporarily as finished goods inventory (FGI) in a storage place, and shipped out to customers by trucking. The location change of the CPs is tracked by the factory control computers using the bar codes attached to the CPs. During this process, operators have to scan the finished CPs to notify the computer servers in multiple occasions or locations in the assembly process until eventually moving them onto trucks. All these being done manually, there is no automated process for assuring the products are routed to the trucks destined for desired locations after they are placed into FGI.

Therefore, what is need is a monitoring system that can wirelessly track and monitor each necessary step of the manufacturing process without being restricted by the limitations of the wired manufacturing environment.

SUMMARY

One embodiment accordingly, provides a method of manufacturing a computer system in a manufacturing facility. The manufacturing process starts from installing a wireless communication subsystem on the computer system, and allows information exchanges to be made wirelessly by the computer system and a manufacturing control computer to complete manufacturing the computer system.

The principal advantage of this embodiment that the manufacturing productivity is greatly improved and that the work flow for manufacturing computing products is further automated.

DETAILED DESCRIPTION

With the demand to have more wireless communication technologies implemented for the computing products (CPs) in general, many CPs have wireless communication devices (or subsystems) built in or become wireless communication devices themselves. It is very common that mobile computing products such as battery powered PCs, handheld PCs, or cell phones have a certain capability to communicate wirelessly through wireless access devices such as wireless modems, radio frequency transceivers, or infrared input/output ports. The disclosed embodiments establish a wireless manufacturing environment by combining existing computer database technology, computer network technology, and wireless access technology so that the manufacturing productivity can be improved significantly.

Figure 1:
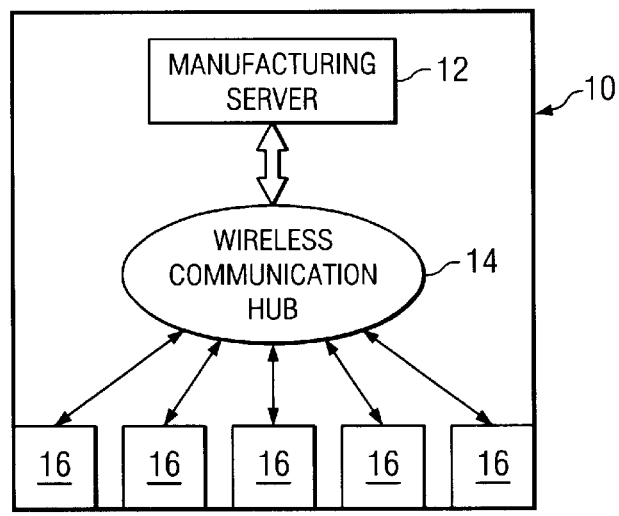
FIG. 1 is a simplified schematic diagram illustrating an embodiment of a wireless information network.

Referring to FIG. 1, an overall schematic diagram is shown illustrating a wireless information network 10. Sitting in the back end is the manufacturing control server 12 which is similar to the conventional control computers designed and configured for CP manufacturing processes. The manufacturing control server 12 is connected through wires to a wireless communication hub 14 at the assembly area in the factory. The wireless communication hub 14 can further connect wirelessly or wiredly to other access nodes 16 if needed. The wireless communication hub 14 and the access nodes 16 can use wireless technologies conforming to standards such as Bluetooth, or IEEE 802.11b, cellular data transmission, Infrared technologies, or any other similar communication technologies. The wireless communication hub 14 and the access nodes 16 typically contain wireless transceivers for wireless communication purposes. In this FIG. 1, the wireless communication hub seems to cover a part of the entire assembly ground, but it is understood that multiple such wireless communication hubs can be installed so that the entire factory is tied into a synchronized wireless information network.

In one embodiment, for mobile CPs having wireless access devices built in, the customization/configuration steps are moved out of the assembly line into a final boxing step with the assistance of the wireless information network. Assuming all CPs in a particular factory are built, loaded with a standard OS, they are placed into a standby state after they are completely built. All the CPs are then boxed or otherwise packaged as in the conventional method ready to be configured and shipped to the customer. A box can be designed (such as having a drop in flap) to accept final configuration/checkoff papers or left unsealed so the checkoff papers can be dropped in.

In the shipping area of the manufacturing process, customers' customization/configuration details are pulled for the first time. The configuration details may include both hardware and software configuration information. The configuration information provided can include, for instance, driver information for the peripheral devices, operating system configuration data, configuration information for application software, or the application software. In most cases, the configuration information is determined by particular customers, and certain information may even come from a service provider of the customer such as an Internet service provider (ISP) or an application service provider (ASP). Communication devices of the factory wireless information network such as a transceiver in the wireless communication hub or the access node activates a built-in interface of the CP, thereby waking the CP up inside the box. The configuration details are then transmitted and stored in the CP via wireless information exchanges between the CP and the wireless information network. Various other types of information can be loaded through such an interface, for example, customer personal information (such as name, address, phone number, etc), customer specified applications (e.g. optional fax service, a personal information manager with preset corporate addresses and managers, etc.), and information for activating customer accounts for cell phone service, fax service registration, ISP details, etc. At the conclusion of the "wireless" configuration process, the CP is instructed to power down, thereby conserving battery power until awakened by the end user. It is also contemplated that the configuration documents or any other paper materials required by the customized configuration, as well as any factory provided paper materials such as user manuals or account information cards are dropped in the box at this time. Thereafter, a shipping label is created and the box is sealed and shipped to the FGI.

Figure 2:
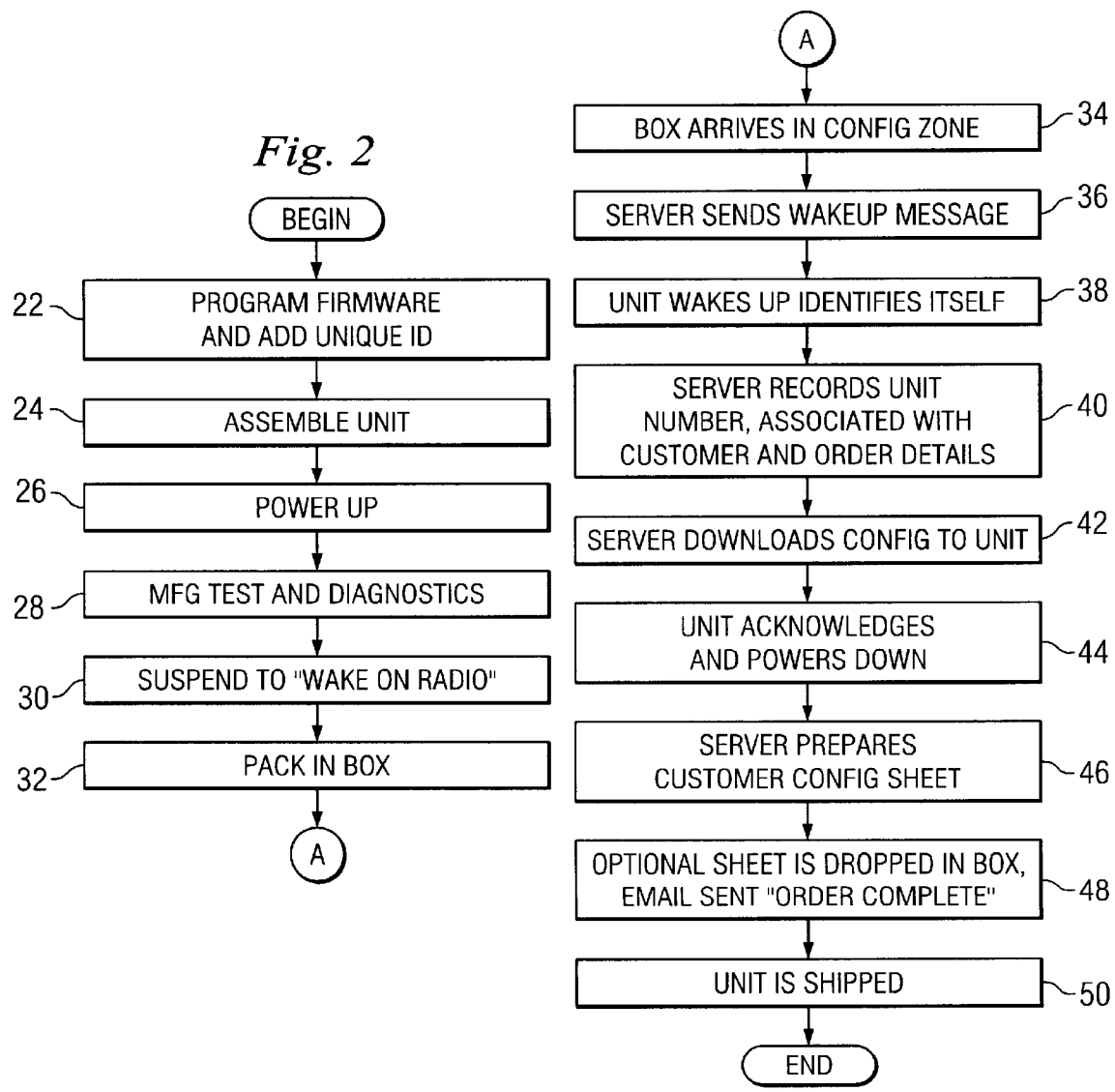
FIG. 2 is a flow diagram illustrating a process for manufacturing a computing product.

Referring to FIG. 2, a flow diagram 20 is shown illustrating more detailed steps taken for the above described wireless configuration process. At the beginning of the manufacturing process, the CP's firmware is programmed and a unique product ID is assigned to the CP in step 22. The CP is assembled with other standard hardware and software components in various assembly steps in step 24. After the assembly is completed, the CP is powered up in step 26, and pushed through multiple steps of manufacturing and diagnostic tests in step 28. Once the CP proves to meet the product quality standard of the factory, the CP is suspended to a standby mode in step 30 to be later awakened by a signal transmitted by the wireless information network. The CP is now ready to be put in a shipping box. The CP packaged in a box (or a "containerized CP") is now shipped to a configuration area of the factory in step 34, and a "wake-up" signal sent by the wireless information network in step 36 triggers the CP to initiate the configuration process. The CP responds to the wake-up signal and feeds back information to the wireless communication hub about its identity (e.g., its ID). It is contemplated that the wireless communication hub can continuously send the wake-up signal to all the CPs arriving in its coverage area so that they can "wake up" in the same order as they arrive. Through the wireless communication hub, the manufacturing control server recognizes the ID of the CP, and associates the ID with customer order details for configuring the CP in step 40. Then, the configuration data is downloaded to the CP in step 44 so that the CP can be customized as it is expected.

In another embodiment, it is contemplated that instead of assigning the ID to the CP in step 22, the ID can be programmed to the CP at step 42. In this example, the wireless information network tracks the number of the CPs coming into a particular coverage area of a wireless communication hub so that an appropriate number of the CPs will be "built to order." For example, if a first customer order with a first configuration plan needs 500 computers to be customized, when the last computer is thus configured, the next computer coming into the coverage area of the wireless communication hub is going to be configured according to another customer order with another configuration plan.

When the configuration is completed in the CP, the CP will send a signal back to the wireless communication hub acknowledging that the expected customization is done (step 44), and instruct the manufacturing control server to prepare or print out a corresponding configuration sheet for use by the customer (step 46). The printed configuration sheet or other paper materials are dropped in the box in step 48, and the CP is then shipped to the FGI in step 50.

In another embodiment, where the wireless access device of the CP is using technologies conforming to the standards set by the Infrared Data Communication Association (IRDA), it is contemplated that a line of sight hole is provided in the box or container of the CP to expose the wireless access device such as an IRDA port so that communication events can be executed as described above.

In yet another embodiment, the configuration information is received by the CP from the wireless information network, but does not perform the actual configuration task until the CP is first turned on by the end-user. This is extremely cost effective if the CP has a wireless communication/access subsystem that can be independently operational without the support of the rest of the CP. The wireless access subsystem can just receive the configuration information for temporary storage in its own memory, and activate the actual configuration process after the CP is fully turned on by the end user. In another example, certain configuration information is provided as described above before the CP reaches the hands of a customer, but once it is turned on by the customer, a communication link is established to the manufacturer or a third party service provider so that more configuration information can be delivered remotely through the communication link so that the CP can be fully configured.

With the speed of wireless data communication increasing, and with the expansion of the wireless communication bandwidth, it is contemplated that the wireless information network can be used to load even the standard software modules and applications, including the OS, for the CPs which only need to have a boot-and-program facility accessible by the wireless communication hub.

Figure 3:
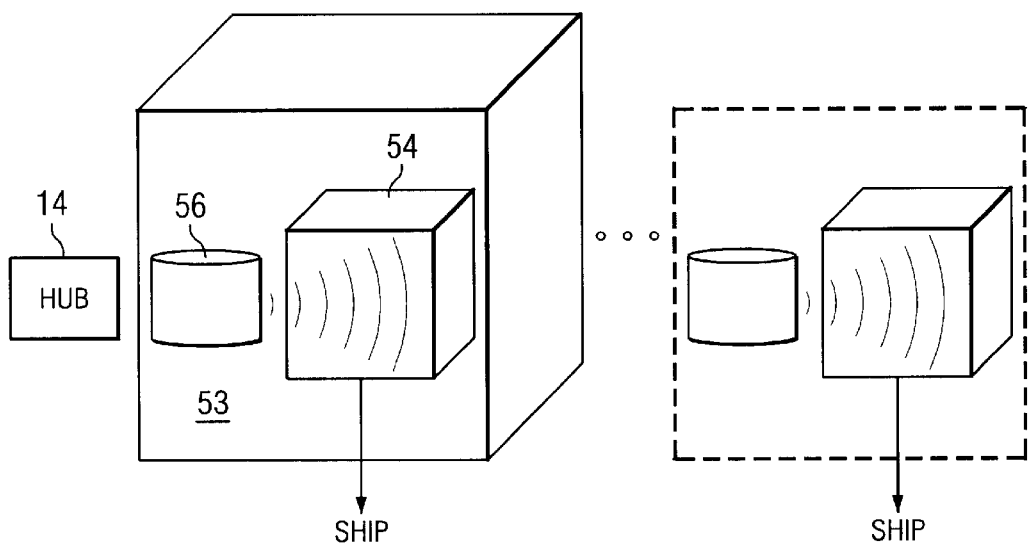
FIG. 3 is a perspective view illustrating an embodiment of the use of Faraday cages.

In the above-described manufacturing and configuration process, it is critical that the wireless information network can clearly identify the CPs so that they would be configured and shipped to particular customers. As mentioned in relation to steps 22 and 40 of FIG. 2 above, it is essential that when multiple CPs come into the final configuration area, they are all appropriately identified. Referring to FIG. 3, a simplified system schematic is shown illustrating the use of Faraday cages according to one embodiment. To enhance the ability of the wireless information network to identify individual CPs, multiple Faraday cages 52 are employed with a wireless transceiver node installed therein. Each of such wireless transceivers can be linked to the wireless communication hub through a wired or a wireless communication line. In one example, the Faraday cage 52 is placed over each CP 54 arriving at the configuration area. The Faraday cage has a wireless node 56 attached to it which can communicate with the wireless communication hub 14. The primary function of the Faraday cages is to block the transmitted signals (whether from the wireless node or the CP) from leaving the enclosure defined by the physical boundary of the cages so that a specific wireless node (e.g., a transmitter) can be associated with a particular CP at a certain time in the manufacturing process. With this accurate identification, the customer orders containing the configuration information will not be mistakenly assigned, printed, or otherwise generated when needed. The use of Faraday cages also eliminates the bandwidth and incoming flow congestion concerns over using a large open wireless network. Signal interference is thus not of concern in the configuration process, and the reliability of this automated process is greatly enhanced.

In another embodiment, a Faraday cage can cover multiple CPs, which will have same configuration requirements. Yet, in another example, the link between the Faraday cage 52 and the wireless communication hub 14 is absolutely wireless, and the Faraday cage 52 can be moved around without being physically limited to any one area of the factory. Consequently, the Faraday cages can be used and reused in various places in the factory and the wireless information network always recognizes which Faraday cage it is communicating with. In examples where IRDA technologies are used, IR barriers such as walls or a large container rather than Faraday cages can be used to isolate and identify the CP.

In yet another embodiment for identifying the incoming CP, a conventional bar code approach is still preferred by some manufacturers, wherein designated employees of the manufacturer at the final stage can manually match the customer orders from the manufacturing control server (and shipping labels, etc.) to the ID attached to the box. This box ID can be either the device's unique ID or a translated/hashed code from the manufacturing control server. After the CPs are aligned with their corresponding customer orders, the wireless information network configures the CPs as described above.

In order to further expand the use of the wireless information network to other processes during the CP assembly, the wireless information network is enhanced to handle all product tracking and monitoring processes. A manufacturing facility for assembling portable computers could utilize wireless networking technologies and the mobility of the battery powered CPs to track in real time the status of work in progress and the finished goods inventory. For example, the wireless information network can be used to track hardware and software loaded onto each CP by communicating directly to the CP. Many time and labor intensive processes such as the setup of a burn-in process can be streamlined. The factory inventory could also be tracked by having the wireless information network report CPs' information such as configuration, service tag, or other pin numbers to the manufacturing control server throughout its build. Even if the CP is packaged, the wireless information network can still report, if needed, which forklift takes the CP to which truck, to which distributor location, and to which final customer location. While the CP is on its way out the door of the factory, the manufacturing control server could then inform the CP to shut itself down for the transportation journey.

It is contemplated that in order to track and report the movement of the CP through different physical locations in the factory, it is required to determine proximity of the CP with respect to a wireless communication hub or a wireless access node. Various embodiments implement this critical element by using different approaches. For example, the locations of the CP can be determined by predetermined ranges of the wireless communication hubs or access nodes. Or, it can be determined through signal triangulation between two access nodes and the CP. In yet another embodiment, a low power access node is used for a small area in the factory in which the CP will be detected immediately without causing signal interference with other surrounding areas. In yet another embodiment, the CPs are directed to travel on different predetermined paths (e.g., through assembly line conveyors or other fixed paths) in the factory thus automatically separated initially. In one embodiment described above, the Faraday cages can be used for this product isolation and identification purpose as well.

Figure 4:
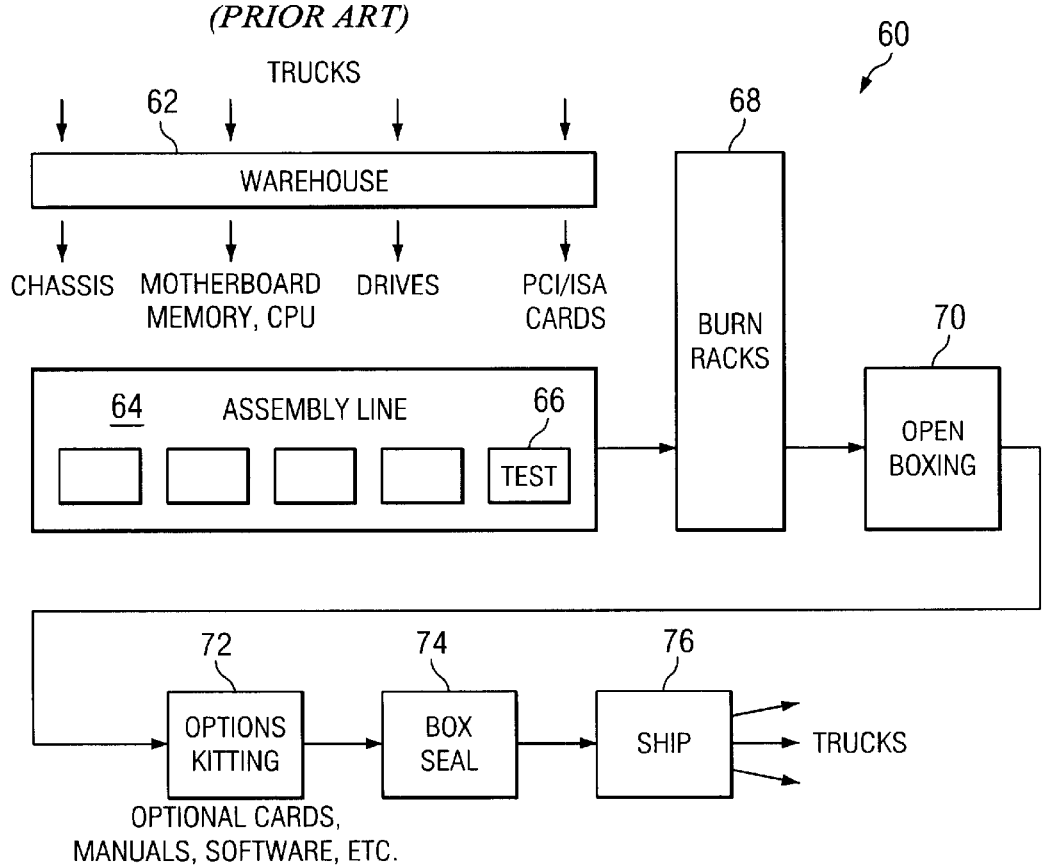
FIG. 4 is a flow diagram illustrating conventional computer assembly flow in a factory.

Taking a computer manufacturer as an example for illustration, in a conventional assembly process where no wireless information network is installed, to build and ship a computer takes various assembly and testing steps. Referring to FIG. 4, a flow diagram 60 is shown illustrating a conventional manufacturing process in a factory of a computer maker. First, components are shipped into a component warehouse 62, and these components are further provided to an assembly line 64. At the beginning of the progressive assembly line, a paper traveler is printed and sent downstream. According to the instruction of the paper traveler, a computer chassis is pulled, and the motherboard is installed. Then hardware components such as the CPU, various drivers, PCI/ISA cards and software are put in appropriate places. The finished computer system or PC enters a startup check 66. During the startup check, an operator has to manually check whether all expected hardware components are properly installed. If it doesn't pass the test, it has to be shipped to the repair shop. If it passes, it goes into a burn rack 68 for a burn-in process. After the burn-in, a test is conducted again, and if the PC is qualified, it is packaged in a box 70, and optional peripheral devices such as I/O devices, monitors are added (block 72), and the box is sealed (block 74) and shipped (block 76). It is noted that the operator in the startup check does not have the ability to check the configuration of the computer, and any mis-configuration can only be detected in the burn-in. The mis-configuration error can cost unnecessary time and burn-in space. It is also noted that during the burn-in and post burn-in test, various components of the PC are checked (e.g., hard drive, memory, video display, key board, audio devices, etc.) to ensure the quality of the PC.

Figure 5:
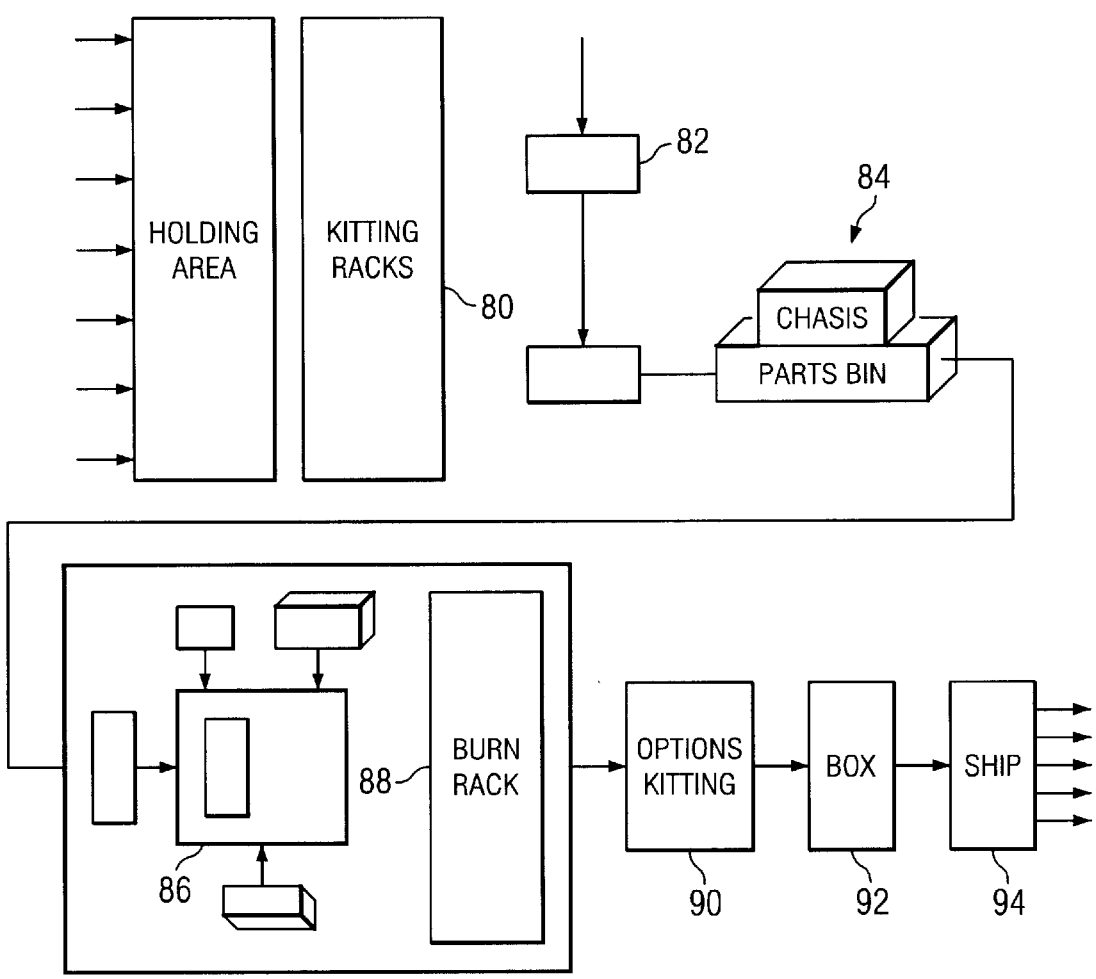
FIG. 5 is a flow diagram illustrating an embodiment of a computer assembly flow using a wireless information network.

In a manufacturing environment where the wireless information network is used extensively, communications with between the wireless information network and the CP can start early and take place in all the assembly stages. Referring now to FIG. 5, a flow diagram 80 is shown illustrating the use of the wireless information network in the computer manufacturer's factory. When components are shipped to the computer manufacturer's factory, there will be a holding area and kitting racks where hardware components can be stored and classified. A traveler 82 is generated by the manufacturing control server and sent to the assembly area or the area where the kitting racks are. Operators in that area would collect the desired chassis as well as all the components necessary for assembly down stream in a parts bin 84. The first component that is installed would be a mother board 86 and its wireless access subsystem. Once the mother board is able to communicate with the wireless information network, when other hardware components such as all peripheral devices and other subsystems are installed, it triggers the information exchanges between the computer in making and the wireless information network. For instance, after an operator plugs in a display adapter, a message can be sent to the operator through his assembly computer station to inform him that the installed hardware matches the configuration defined by the traveler. Once the computer is fully assembled and operational, it is sent to the burn rack 88, and more information is provided to the wireless information network to help facilitate the work in progress. It is also contemplated that some startup checks can be done simultaneously on the burn rack. The assembled computer is then added with optional components (block 90), boxed (block 94), and shipped out for customers (block 94). In every single process step, the computer can communicate with the wireless information network to provide information to track, monitor, or confirm the work in progress until the shipping truck leaves the factory.

In another embodiment, the wireless information network does not have to deal with the entire CP. For example, in a conventional method, when a mother board maker ships to a computer manufacturer a certain quantity of mother boards, the computer manufacturer does not have any reliable data information regarding the functionality and level of testing of the received mother boards other than the information provided by the mother board maker. Therefore, the computer manufacturer has to put all the motherboards in burn-in and conduct post burn-in tests. If the motherboards have wireless access devices or subsystems built in, they can be checked in a more efficient way. Upon receiving such motherboards, the wireless information network can turn the subsystems on and query them for their product characteristic information. The product characteristic information such as processor speed, chipset, or some of initial diagnostic test results can be obtained immediately. It is noted that, in one example, the entire motherboard does not need to be powered up, only the wireless access subsystem. This will assist the decision to route the motherboards and detect possible defects of the motherboard as early as possible. Although the mother board is used above as an example, it is understood that any other component of the CPs that has a wireless access subsystem associated with it can be communicated, monitored, tracked, and managed efficiently by using its capability to exchange information with the wireless information network in the factory.

In yet another embodiment, a wireless access subsystem is incorporated in a CP through one of its peripheral ports so that the communications between the manufacturer of the CP and the CP can be executed largely independent of other integrated parts of the CP. Taking the computer manufacturer for example, when the mother board is first identified for further assembly, in one of the preferred embodiments of the present embodiments, a Bluetooth memory recorder on a USB plug can be used as the wireless access subsystem.

Figure 6:
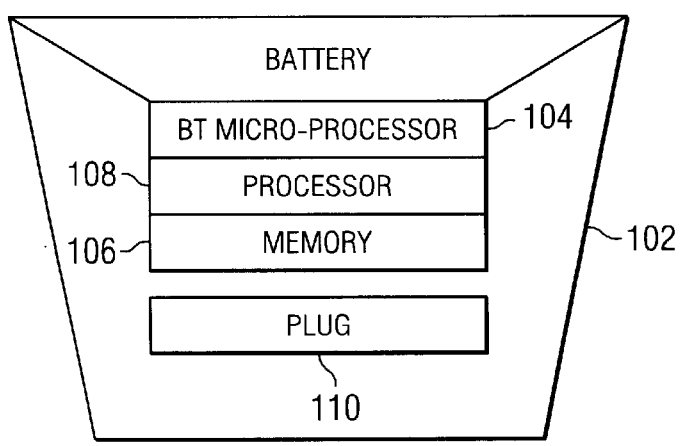
FIG. 6 is a simplified schematic illustrating an embodiment of a wireless access subsystem attached to a peripheral port of a computing product.

Referring now to FIG. 6, a simple schematic for such a Bluetooth based wireless access subsystem 100 is shown. Inside this wireless access subsystem, there is a battery device 102, a Bluetooth based microprocessor 104, and a memory device 106. If the Bluetooth based microprocessor 104 is not sufficient for the processing need, an independent microprocessor 108 can be incorporated therein. A plug portion 110 of this Bluetooth based wireless access subsystem 100 can be plugged into an input/output port of the CP such as a USB port. When this wireless access subsystem is plugged into the mother board (or any CP in assembly such as a regular computer system, cell phone, etc.), the wireless information network can immediately communicate with the mother board and start to track the CP through this wireless access subsystem. Such a wireless access system can be preloaded with instructions for initiating the CP for its configuration or customization.

In one embodiment, when the CP is fully assembled and activated for the first time, a system boot program can instruct the CP to check the USB port checking the existence of this wireless access subsystem. If it is found to be in existence, instructions will be obtained for the CP to configure further. Because such a wireless access subsystem accesses the CP through its peripheral port, it is easy for the manufacturer to remove it from the CP right before the CP is shipped for the customer. In this way, the wireless access subsystem can be reconfigured and reused in the factory for multiple times as long as the battery life of the subsystem is sustained.

One of the major advantages of this embodiment is that the wireless access subsystem can be easily adapted to the current manufacturing process without much hardware realignment because there is no requirement for the CP to provide power, or an integrated wireless communication device (such as a wireless modem). Moreover, when the wireless access subsystem on the peripheral port is released from the CP, it carries the ID of the CP along with all its configuration information. This released subsystem thus can inform a final verification station of all information needed to be shipped to the customer. For instance, final optional devices can be added, and shipping instructions and labels can be printed, etc. In addition, the use of such a wireless access subsystem through the peripheral port eliminates the need to use the Faraday cage as described above because information is exchanged from point to point between the wireless information network and the CP without interfering with each other. Moreover, if needed, the detachable wireless access subsystem may be temporarily removed from the CP, and plugged into an identifier station for the purpose of physically associating a particular wireless access subsystem with a specific CP. It is also further understood that the peripheral port can be a serial port, a parallel port, a PC card, or any other industry standard port.

By using the detachable wireless access subsystem through a peripheral port as described above, the communications between the manufacturer of the CP and the CP can go beyond the physical limits of the manufacturing factory. Many CP manufacturers only ship CPs with a standard setup to its distributors/dealers. It is up to the distributors to customize the computer for their respective customers. With the detachable wireless access subsystem installed in the CPs, the distributor can provide configuration information to the CPs in the boxes wirelessly without dismantling the packaging and powering up the CPs. When the customer turns on the CP for the first time, the wireless access subsystem will assist the CP to complete the configurations. It is also contemplated that the distributor may receive configuration information from the detachable wireless access subsystem to complete configuration of the CP at its site before the CP is shipped to the customer. It is further contemplated that in some situations the distributor would interact with the CP (or even the wireless access subsystem alone) to initiate a process for the wireless access subsystem to send the configuration information stored to a service provider identified by the distributor through a communication link.

In yet another embodiment, a customer orders the CP with specific software setup directly from the manufacturer, but the CP ordered is to be shipped to a retail store for the customer to pick up. In this case, the wireless access subsystem helps to complete the manufacturing processes as described above and is then shipped to the customer along with the CP. The wireless access subsystem can store confidential information of the customers such as credit card information, cell phone account number, and customer privacy information. The retail store would not know what is in the detachable wireless access subsystem, and the integrity of the confidential information us preserved. For the customer, he can use the detachable wireless access subsystem to provide information to further service the CP. For example, the information stored in the detachable wireless access subsystem can serve as a key to acknowledge a license purchased by the customer along with his purchase of the CP. The detachable wireless access subsystem can also help to store system configuration information instead of the hard drive or similar memory portion of the CP. In case the CP has an accident with the hard drive, the system configuration information can be recovered from the detachable wireless access subsystem. The confidential information stored in the detachable wireless access subsystem can also be provided to a third party automatically with the permission of the customer. For instance, if the customer chooses to set up an account with a recommended Internet Service Provider, his confidential information can be retrieved from the wireless access subsystem and sent through a wired or a wireless communication link to such a thira party without being entered again by the customer. Usually, software for such a third party on the CP will be configured with the guidance provided by the wireless access subsystem.

As can be seen, the principal advantages of these embodiments are that the manufacturing productivity is greatly improved and that the manufacturing process for the computing products is further automated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of manufacturing a computer system in a manufacturing facility comprising:

assigning a unique product ID to the computer system;

assembling and packaging the computer system including installing a wireless communication subsystem thereon;

activating the subsystem by a wireless network in the manufacturing facility which recognizes the product ID; and configuring the computer system by transmitting and storing configuration information in the packaged computer system via the network to complete manufacturing the computer system.

2. The method of claim 1 wherein the information includes burn-in test information.

3. The method of claim 1 wherein the information includes factory tracking information for the computer system.

4. The method of claim 1 wherein the information includes information for confirming whether a predetermined hardware component is installed according to a predetermined hardware configuration.

5. The method of claim 1 wherein the information includes information for confirming whether a predetermined software is successfully configured.

6. The method of claim 1 wherein the information includes an instruction to power down the computer system prior to shipment.

7. The method of claim 1 wherein communication isolation devices are used to facilitate the information exchanged between the computer system and the manufacturing control computer.

8. The method of claim 7 wherein the communication isolation devices are Faraday cages with a wireless communication access device attached thereto.

9. The method of claim 1 wherein the exchanging further comprises:

requesting the computer system to provide test information to the manufacturing control computer; and requesting the computer system to provide tracking information to the manufacturing control computer.

10. The method of claim 1 further comprising:

placing the manufactured computer system in a testing station for executing product diagnostic tests.

11. The method of claim 10 wherein the manufacturing control computer wirelessly exchanges information with the computer system in the testing station.

12. The method of claim 1 wherein the assembled computer system is battery-powered.

13. A method of manufacturing a computer system in a manufacturing facility, the manufacturing facility having a wireless information network, the method comprising:

assigning a unique product ID to the computer system;

collecting all hardware components for a computer system according to a predetermined hardware configuration;

assembling and packaging the computer system from the collected hardware components including a wireless communication subsystem thereon;

activating the subsystem by a wireless network in the manufacturing facility which recognizes the product ID; and completing the packaged computer system with information exchanged wirelessly between the computer system and wireless information network, wherein the information exchanged assists installing the hardware components, configuring the computer system, and testing the computer system.

14. The method of claim 13 further comprising:

routing the completed computer system by identifying a shipping destination.

15. The method of claim 13 wherein the completing further comprises:

providing testing information of the computer system to the wireless information network.

16. The method of claim 13 wherein the completing further comprises:

providing predetermined customer information for the completed computer system.

17. A method of assembling a computer subsystem in a computer manufacturing facility, the manufacturing facility having a wireless information network and the computer subsystem having a wireless communication device built therein, the method comprising:

assigning a unique product ID to the computer system for identifying an incoming computer subsystem provided by a component provider;

assembling and packaging the computer system;

requesting, by the wireless information network, information regarding the incoming computer subsystem;

configuring the computer system by transmitting and storing configuration information in the packaged computer system via the network; and routing the incoming computer subsystem according to the requested information.

18. The method of claim 17 wherein the computer subsystem is a mother board.

19. The method of claim 17 wherein the information requested by the wireless information network informs product characteristics of the computer subsystem.

* * * * *